United States Patent [19]

Besler

[11] 4,058,303

[45] Nov. 15, 1977

[54] TRUE CUT COMBINATION

[76] Inventor: Ervin Besler, 2992 Fairweather Drive, Medford, Oreg. 97501

[21] Appl. No.: 789,527

[22] Filed: Apr. 21, 1977

[51] Int. Cl.² .............................................. B25B 11/02
[52] U.S. Cl. ................................. 269/315; 269/321 S
[58] Field of Search ............ 269/293, 303, 315, 321 S, 269/321 F, 321 MF, 43, 95, 101; 83/467 R, 454, 455; 144/253 R; 145/1

[56] References Cited

U.S. PATENT DOCUMENTS

| | | | |
|---|---|---|---|
| 2,718,247 | 9/1955 | Kalina | 145/1 |
| 2,911,022 | 11/1959 | Brown | 145/1 |
| 3,124,181 | 3/1964 | Clemans | 269/315 |

Primary Examiner—Robert C. Watson

Attorney, Agent, or Firm—Clarence M. Crews

[57] ABSTRACT

This invention relates to a combination of three light compact metallic members adapted for temporary attachment to a sawbuck supported auxiliary length of timber, illustratively a two-by-four, for guiding a carpenter, who is equipped with a hand circular saw, in cutting lumber pieces of uniform cross-section into pieces of precisely controlled length. The three metallic pieces comprise a T-square, which serves as a saw guide, an end stop, and a carrier for supporting workpieces from the sawbuck supported timber after the work-piece has been reduced to a length which, when in cutting position, is inadequate to derive simultaneous support from both sawbucks. The three metallic pieces are adapted to be united into a compact unit for transportation and/or storage, by a single bolt.

9 Claims, 8 Drawing Figures

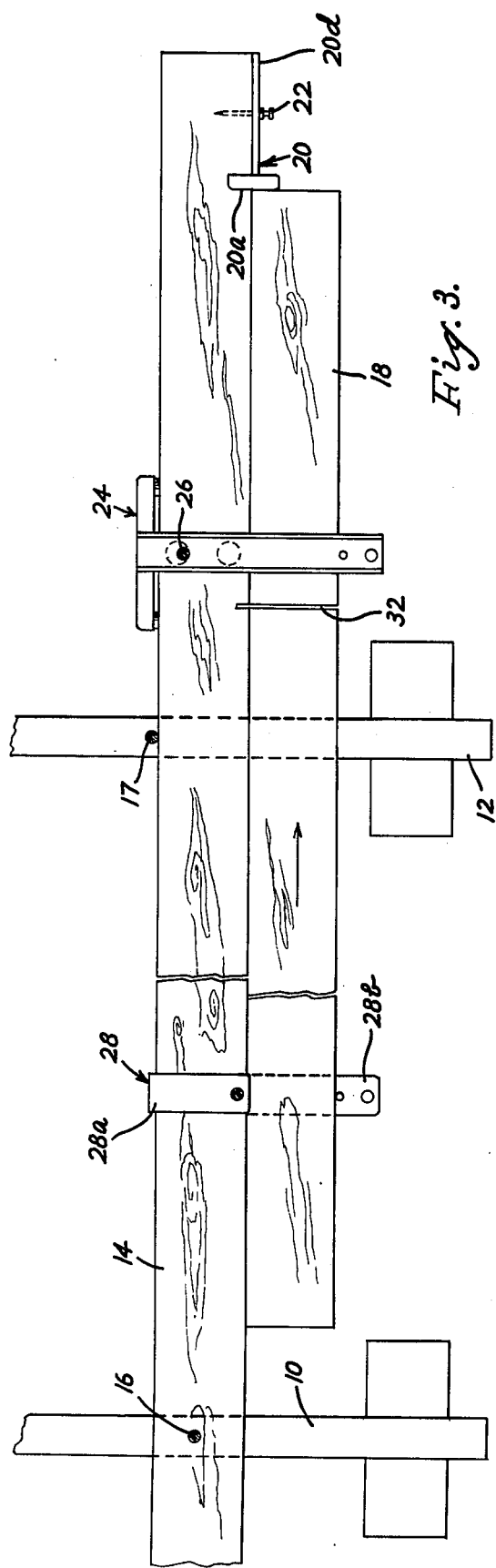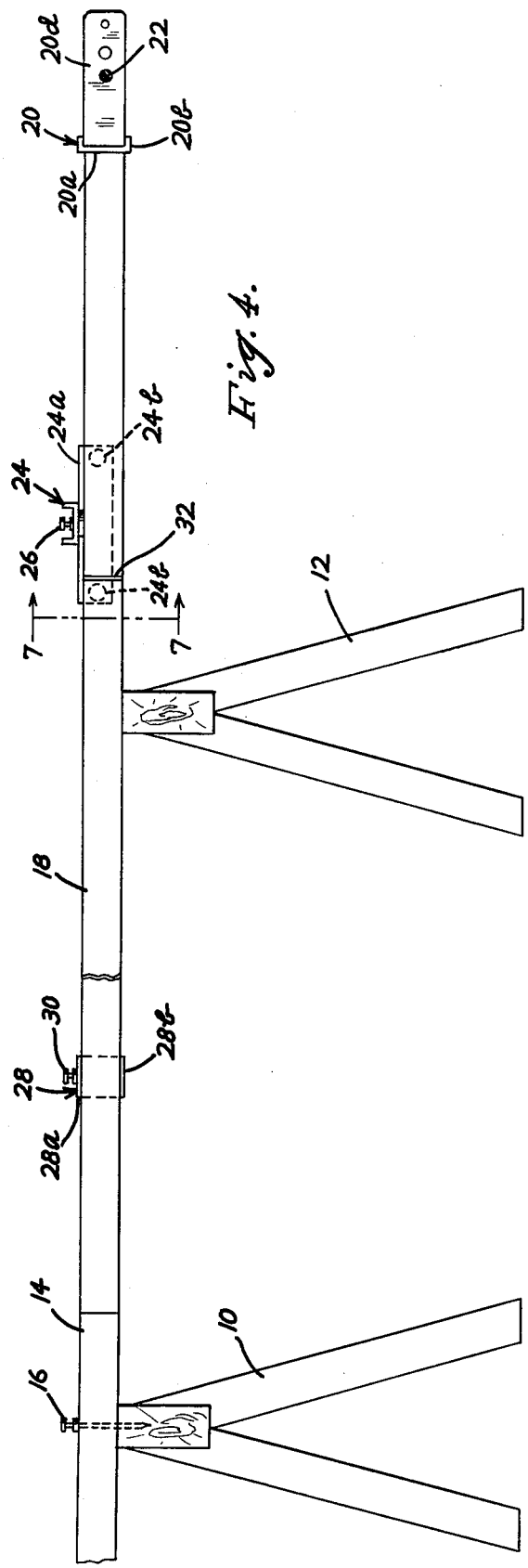

TRUE CUT COMBINATION

This invention relates to sawing equipment and more particularly to light, conveniently transportable, and compact equipment adapted for use in conjunction with a hand carried circular saw.

Not only does this equipment obviate the need for transporting a heavy radial arm saw to and from a work site, but it can be set up in conjunction with two sawhorses and an auxiliary length of timber much more quickly and economically than a radial arm saw with required accessories could be unloaded and put into place.

It is a feature that in addition to two sawhorses, an auxiliary length of timber (illustratively a two-by-four), and a hand carried saw, my equipment includes three simple and inexpensive metallic parts which may be quickly applied to the auxiliary timber, to-wit: an end stop, a saw guiding T-square, and a carrier for supporting the work-piece between the sawbucks after the work piece has been reduced to a length inadequate to span the sawbucks when in cutting position.

It is a further feature that the stop, T-square and carrier when not in use are adapted to be compactly assembled and united by a single bolt into a single compact unit.

Other objects and advantages will hereinafter appear.

In the drawing forming part of this specification,

FIG. 3 is a fragmentary plan view, broken away intermediate its ends, showing my three piece true cutting equipment in operative association with two sawhorses, and an auxiliary two-by-four;

FIG. 4 is a view in side elevation of the structure illustrated in FIG. 3;

Figure 1:
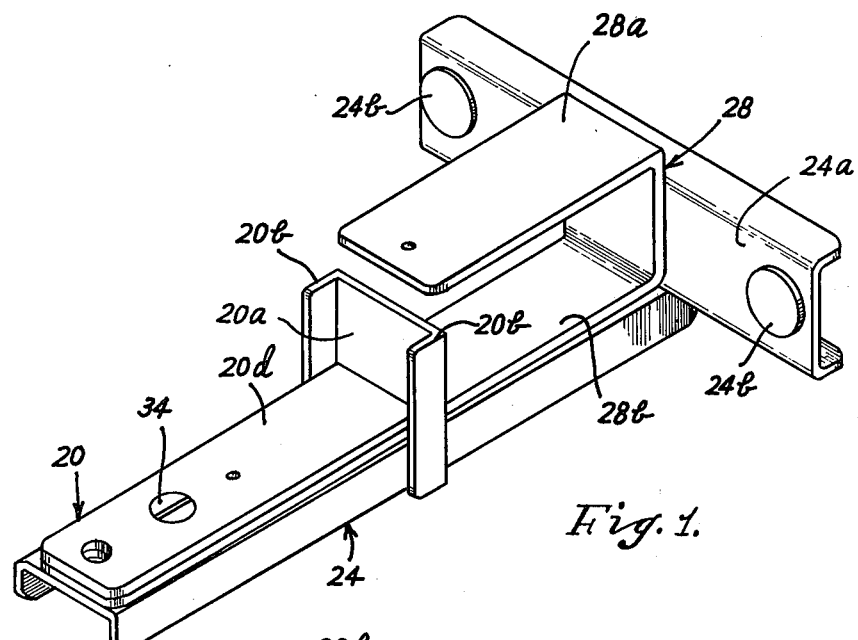
FIG. 1 is a perspective view of my three piece true cutting equipment as the pieces may be associated and held together when not in use by a bolt and a nut, the nut being welded to the under-surface of the T-square.

While the invention may be designed for dealing with work-pieces of various cross-sectional dimensions, it will be shown and described illustratively as embodied in a structure for dealing specifically with two-by-fours.

In FIGS. 3 and 4 it will be seen that two sawbucks 10 and 12 of conventional construction are provided, upon which an auxiliary length of timber 14, illustratively a two-by-four, is mounted. The member 14 is desirably secured to the sawbuck 10 by a duplex nail 16. Such a nail is of the readily extractible type, having both a head and a collar spaced therefrom. All nails referred to herein are desirably of this type.

One nail 17 is tacked to sawbuck 20 next to the auxiliary two-by-four 14 to prevent creeping of said auxiliary two-by-four.

A two-by-four work-piece 18, initially considerably longer than the space between sawbucks, is placed upon the sawbucks with its squared leading end in engagement with a work stop member 20, which member is removably affixed to the auxiliary two-by-four 14 by a nail 22.

Figure 5:
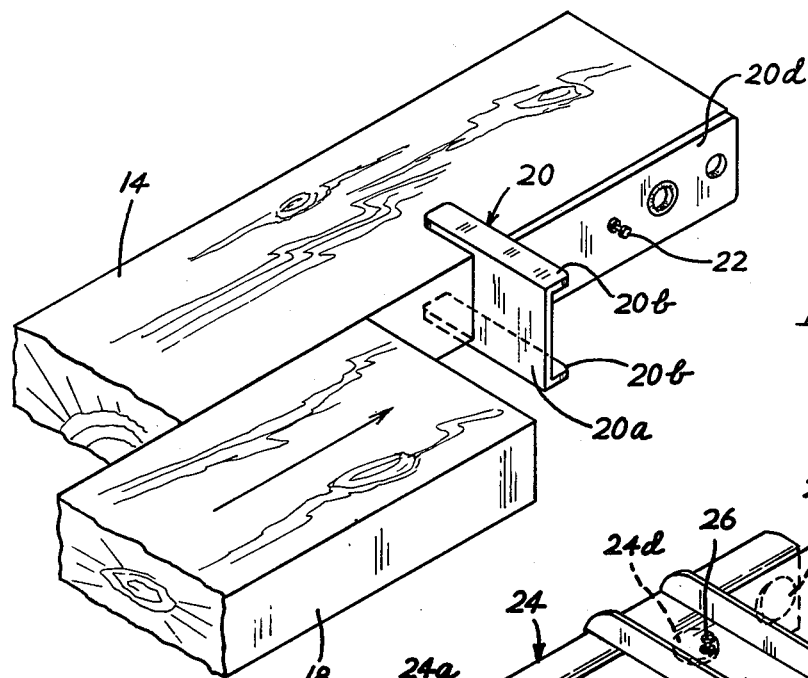
FIG. 5 is a fragmentary perspective view showing the end stop in association with the supporting timber and a workpiece about to be put into engagement with the end stop.
Figure 6:
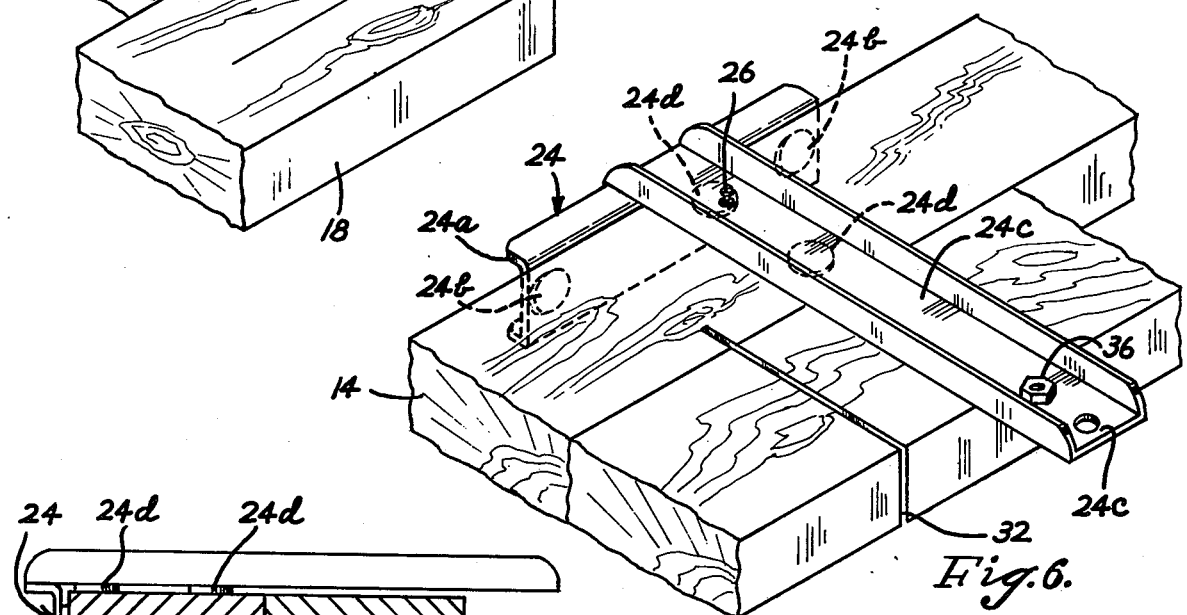
FIG. 6 is a fragmentary perspective view showing the saw guide in association with the supporting timber and a workpiece ready for cutting.
Figure 7:
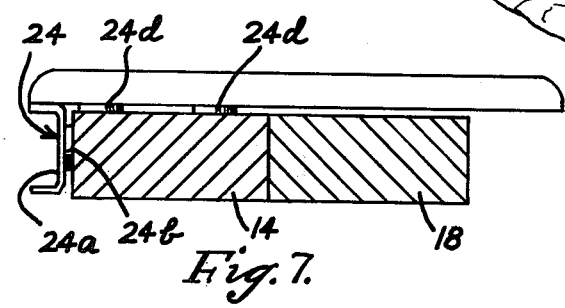
FIG. 7 is a sectional view taken upon the line 7—7 of FIG. 4, looking in the direction of the arrows and showing the saw guide in association with the supporting timber and a work-piece.
Figure 8:
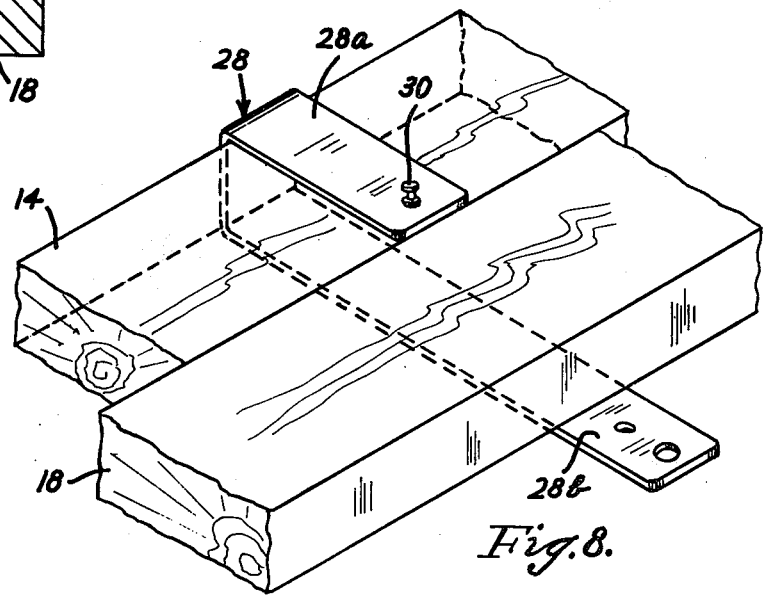
FIG. 8 is a fragmentary perspective view showing the carrier in association with the supporting timber and an uncut work-piece.

As best seen in FIG. 5, the work stop member 20 is an integral member which includes a work-piece blocking face 20a, a forwardly extending flat arm 20d which extends forward in engagement with a side face of the auxiliary two-by-four 14, and upper and lower parallel side flanges 20b, which embrace the auxiliary two-by-four 14. The member 20 is affixed to the auxiliary two-by-four 14 by a nail 22.

A saw guide 24, which takes the form of a T-square, is secured to the auxiliary two-by-four 14 at a chosen predetermined distance from the end stop 20 by a duplex nail 26. The nail 26 must have a proper angle so that when it is pounded in all the way it will force 24a firmly against the auxiliary two-by-four to prevent any movement and thus assure uniformity of position of the saw guide 24. The guide member 24 includes a flanged vertical portion 24a having circular tabs 24b of limited area which bear against a side of the auxiliary two-by-four 14, and a flanged horizontal portion 24c having circular tabs 24d which bear against the upper surface of the auxiliary two-by-four 14.

A U-shaped carrier 28 having a short upper arm 28a and a long lower arm 28b embraces the auxiliary two-by-four, being attached thereto by a nail 30. The carrier as shown is disposed about midway between the sawhorses 10 and 12, but it may be located at whatever position between the sawhorses is judged to be most useful for a support of the trailing end of the two-by-four 18 that is being sawed into pieces.

The point should not be overlooked that when a hand-held rotary saw is guided by the T-square 24, the line of cut 32 is spaced a predetermined, saw controlled, substantial distance from the nearer edge of the T-square, so that the saw teeth engage nothing but wood.

Figure 2:
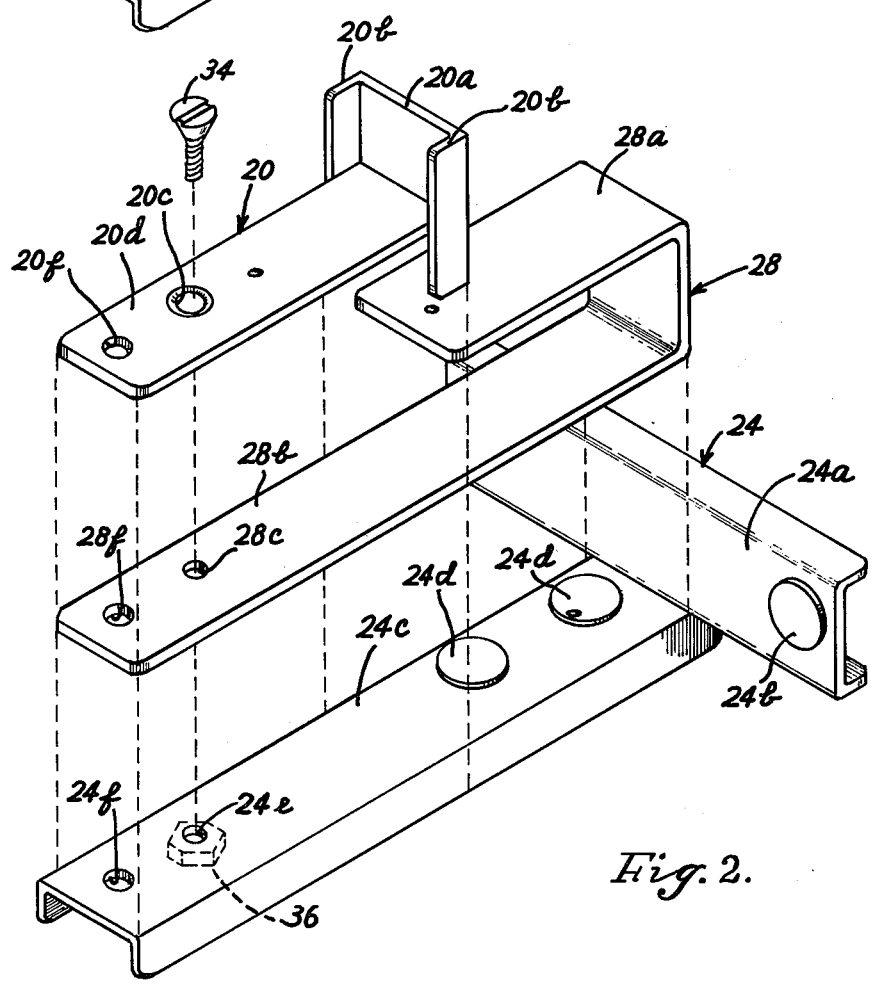
FIG. 2 is an exploded perspective view of the same elements illustrated in FIG. 1.

The parts 20, 24 and 28 are designed to be neatly and firmly fitted and secured to one another when not in use, as illustrated in FIG. 1 and further made apparent in FIG. 2.

The arms 20d, 28b and 24c are of substantially equal widths, and they are superposed as indicated in FIGS. 1 and 2. Holes 20c, 28c and 24e are superposed in alignment with one another and the shank of a headed bolt 34 is passed downward through the aligned openings as indicated in FIG. 2 and secured in clamping relation to the associated parts by a nut 36. The nut 36 is welded to the under-surface of arm 24c. When the bolt 34 is not being used for holding the parts 20, 24 and 28 together, the bolt may be threaded partway into the nut 36. By this expedient the bolt and nut are made immediately available when needed.

When thus secured, the arms 20b extend downward alongside 24 and 28, embracing them snugly, and maintaining 24 and 28 in registration with one another and with 20.

When united as shown in FIG. 1 the parts 20, 28 and 24 have aligned holes 20f, 28f and 24f, respectively, so that the assembly of FIG. 1 can be hung on a nail or other suitable hanger.

I have described what I believe to be the best embodiment of my invention. What I desire to cover by letters patent, however, is set forth in the appended claims.

I claim:

1. A beam cutting assembly for use in conjunction with a pair of work-piece supporting sawbucks, an auxiliary length of timber supported by the sawbucks, and a hand carried circular saw, said assembly comprising,
   a. an end stop attachable to the auxiliary length of timber for controlling the position of the leading end of the beam to be cut,
   b. a saw guide attachable to the auxiliary length of timber for determining the line of cut, and
   c. a carrier attachable to the auxiliary length of timber between the sawbucks for supporting the tail end of the beam during cutting when the beam has been rendered too short to extend from sawbuck to sawbuck.

2. A beam cutting assembly as set forth in claim 1 in which the end stop includes an elongated straight and flat body portion attachable to an edge face of the auxiliary length of timber, and a two-flanged head portion at one side only of the body portion, the flanges only being extended to the opposite side of the body portion and spaced apart to embrace the auxiliary length of timber.

3. A beam cutting a assembly as set forth in claim 1 in which the saw guide takes the form of a T-square, the body of the tee being adapted to rest on the upper surface of the auxiliary length of timber and on the work-piece to serve as the saw guide, and the crossing member of the tee being engageable with a side face of the auxiliary length of timber for assuring that the saw guide will bear exactly the desired angular relation to the workpiece.

4. A beam cutting assembly as set forth in claim 3 in which the body and stem of the saw guide are flanged for lightness and rigidity.

5. A beam cutting assembly as set forth in claim 1 in which the carrier is U-shaped, having a short upper leg to rest on the upper surface of the auxiliary length of timber and a long lower face which bears against the lower face of the auxiliary length of timber and extends substantially beyond it to support the work-piece in the same plane as such lower face of the auxiliary length of timber.

6. A beam cutting assembly as set forth in claim 1 in which each of the three elements, end stop, saw guide and carrier, is of metallic construction and each includes a perforation through which it may be nailed to the auxiliary length of timber supported by the sawbucks.

7. A beam cutting assembly as set forth in claim 1 in which the three elements, end stop, saw guide and carrier, include arms of the same width adapted to be superposed when not in use and holes of like diameters in said arms adapted to be registered and united by a screw and nut combination, the member with the shortest arm having ears which embrace the arms of the other two for fixing the relation of the parts to one another.

8. A beam cutting assembly as set forth in claim 7 in which the three elements when united have registered holes adapting the united parts to be stored together on a common hanger.

9. A beam cutting assembly as set forth in claim 1 in which horizontal and vertical work engaging members of the saw guide are formed with widely spaced work engaging surface portions of limited areas for minimizing cutting deviations that might otherwise result from surface irregularities of the auxiliary length of timber supported by the sawbucks.

* * * * *